(12) United States Patent
Saito et al.

(10) Patent No.: US 7,621,980 B2
(45) Date of Patent: Nov. 24, 2009

(54) CARBON DIOXIDE ABSORBENT AND CARBON DIOXIDE ABSORPTION METHOD USING THE SAME

(75) Inventors: Yoshinori Saito, Otsu (JP); Yukio Sakabe, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/199,521

(22) Filed: Aug. 27, 2008

(65) Prior Publication Data

US 2009/0000476 A1 Jan. 1, 2009

Related U.S. Application Data

(63) Continuation of application No. PCT/JP2006/318860, filed on Sep. 22, 2006.

(30) Foreign Application Priority Data

Feb. 28, 2006 (JP) ............... 2006-053585

(51) Int. Cl.
B01J 20/04 (2006.01)
B01D 53/14 (2006.01)

(52) U.S. Cl. ........................... 95/139

(58) Field of Classification Search .......... 96/108, 96/143, 153; 95/90, 139, 148, 900, 902; 423/220, 230, 594.16, 635–637, 598; 502/525
See application file for complete search history.

(56) References Cited

U.S. PATENT DOCUMENTS 4,829,033 A * 5/1989 Menashi et al. ............. 501/139

6,482,387 B1 * 11/2002 Gulgun et al. ............. 423/593.1
6,728,094 B2 * 4/2004 Nakaya et al. ............. 361/321.2
2002/0179887 A1 * 12/2002 Zeng et al. ................. 252/373
2004/0028601 A1 * 2/2004 Torii et al. .................. 423/598

FOREIGN PATENT DOCUMENTS

| JP | 55-003104 A * | 1/1980 |
| JP | 2000-262890 | 9/2000 |
| WO | WO-2006/013695 | 2/2006 |

OTHER PUBLICATIONS

Pfaff, G. "Synthesis and characterization of Ba2TiO4", Journal of Materials Science Letters, pp. 1059-1060, 1991.*
International Search Report, PCT/JP06/318860, mailed Nov. 2006.

* cited by examiner

*Primary Examiner*—Frank M Lawrence
(74) *Attorney, Agent, or Firm*—Dickstein Shapiro LLP

(57) ABSTRACT

A carbon dioxide absorbent that can absorb carbon dioxide at a temperature lower than that of a conventional $Ba_2TiO_4$ absorbent, as well as at a high temperature of at least 700° C., and desorb carbon dioxide at a temperature lower than that of the conventional absorbent is provided. The carbon dioxide absorbent does not expand significantly upon absorption of carbon dioxide, and exhibits high durability. The carbon dioxide absorbent is mainly composed of an oxide that contains Ba, Ca, and Ti, in which the molar ratio of Ca:(Ba+Ca) is 0.25:1 to 0.65:1, and the molar ratio of (Ba+Ca):Ti is 2.2:1 to 4.0:1. It preferably uses a green sheet, waste green sheet, waste green sheet laminate, or green sheet precursor used in a process of manufacturing electronic components can be as at least part of raw materials for making the carbon dioxide absorbent. A carbon dioxide absorption method using the carbon dioxide absorbent is also provided.

6 Claims, 4 Drawing Sheets

CARBON DIOXIDE ABSORBENT AND CARBON DIOXIDE ABSORPTION METHOD USING THE SAME

This is a continuation of application Serial No. PCT/JP2006/318860, filed Sep. 22, 2006.

TECHNICAL FIELD

The present invention relates to a carbon dioxide absorbent and a carbon dioxide absorption method using the carbon dioxide absorbent. More particularly, the present invention relates to a reusable carbon dioxide absorbent that can absorb carbon dioxide efficiently at high temperatures and desorb the carbon dioxide under particular conditions, and a carbon dioxide absorption method using the carbon dioxide absorbent.

BACKGROUND ART

In general, multilayer ceramic electronic components, such as multilayer ceramic capacitors, have been manufactured, for example, by forming dielectric ceramic green sheets from ceramic slurry mainly composed of a powdery dielectric material, such as barium titanate, printing electrodes on the ceramic green sheets, punching the ceramic green sheets into a predetermined shape, and stacking the punched sheets.

Unnecessary parts remaining after the ceramic green sheets have been punched may be reused as the ceramic raw material. However, the unnecessary parts often cannot be reused because the nonuniform particle size distribution of redispersed ceramic raw material may cause variations in the dielectric properties after firing, or electrode components remaining on the ceramic green sheets may have adverse effects on the dielectric properties as impurities.

Thus, effective reuse of waste titanate ceramic materials mainly composed of barium titanate has been investigated.

A carbon dioxide absorbent containing at least one selected from the group consisting of lithium silicates having a general formula of $Li_xSi_yO_z$ has been proposed as a carbon dioxide absorbent for recovering carbon dioxide ($CO_2$), emitted from power plants using hydrocarbon fuels and automobiles, at high temperatures (see Patent Document 1).

This carbon dioxide absorbent is lightweight and absorbs carbon dioxide at a temperature of more than about 500° C.

More specifically, lithium silicate ($Li_4SiO_4$) absorbs carbon dioxide at a high temperature of more than 500° C. in the reaction represented by (1).

$$Li_4SiO_4 + CO_2 \rightarrow Li_2SiO_3 + Li_2CO_3 \quad (1)$$

However, the volume of lithium silicate varies greatly with the absorption and desorbtion of carbon dioxide. Thus, the strength of the absorbent decreases gradually owing to repetitive stress over time. More specifically, absorption of carbon dioxide increases the volume of lithium silicate by about 1.4 times. Thus, the repetitive absorption and desorbtion of carbon dioxide reduces the strength of the absorbent to finally disintegrate the absorbent. Hence, an absorbent made of lithium silicate has low durability.

While lithium silicate is intended to absorb carbon dioxide in a high-temperature combustion gas, it is actually difficult to remove carbon dioxide from exhaust gas having a high temperature of 700° C. or more.

The use of lithium silicate is also examined to separate carbon dioxide before combustion in a hydrogen production process, for example, used for fuel cells. However, reactions occur at a temperature of at least 700° C. in an actual process of hydrogen production including steam reforming of natural gas. Thus, it is difficult to remove carbon dioxide with lithium silicate at such a high temperature.

Furthermore, the composition of the absorbent becomes nonuniform over time because lithium carbonate becomes liquid at high temperature.

In such a situation, a method for absorbing carbon dioxide with $Ba_2TiO_4$ has been proposed (prior application 1 (Japanese patent application No. 2004-348990)). $Ba_2TiO_4$ is prepared by firing barium titanate ($BaTiO_3$) in the presence of barium carbonate ($BaCO_3$) according to the chemical reaction (2).

$$BaTiO_3 + BaCO_3 \rightarrow Ba_2TiO_4 + CO_2 \uparrow \quad (2)$$

$Ba_2TiO_4$ absorbs carbon dioxide to yield $BaTiO_3$ according to the chemical reaction (3) under particular conditions.

$$Ba_2TiO_4 + CO_2 \rightarrow BaTiO_3 + BaCO_3 \quad (3)$$

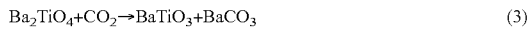

The resulting $BaTiO_3$ desorbs carbon dioxide and reverts to being $Ba_2TiO_4$ according to the reaction (2) at a particular pressure (reduced pressure of 1000 Pa or less) and a particular temperature (at least 750° C.).

$$BaTiO_3 + BaCO_3 \rightarrow Ba_2TiO_4 + CO_2 \uparrow \quad (2)$$

Thus, according to the chemical reactions (3) and (2), the carbon dioxide absorbent $Ba_2TiO_4$ can be used to absorb carbon dioxide at high temperatures and can be regenerated by desorbing carbon dioxide under particular conditions. The carbon dioxide absorbent $Ba_2TiO_4$ can therefore be used repeatedly to absorb carbon dioxide efficiently.

However, there is a demand for a carbon dioxide absorbent that can absorb and desorb carbon dioxide at a temperature lower than that of the absorbent mainly composed of $Ba_2TiO_4$, or a carbon dioxide absorbent that can absorb more carbon dioxide than the absorbent mainly composed of $Ba_2TiO_4$ to improve the flexibility of operating conditions and the absorption and desorbtion efficiency of carbon dioxide.

Patent Document 1: Japanese Unexamined Patent Application Publication No. 2000-262890

DISCLOSURE OF THE INVENTION

Problems to be Solved by the Invention

To solve the problems described above, it is an object of the present invention to provide a carbon dioxide absorbent that can absorb carbon dioxide at a temperature lower than that of a conventional absorbent mainly composed of $Ba_2TiO_4$, as well as at a high temperature of at least 700° C., and desorb carbon dioxide at a temperature lower than that of the conventional absorbent. The carbon dioxide absorbent according to the present invention does not expand significantly by the absorption of carbon dioxide, and exhibits high durability. It is another object of the present invention to provide a carbon dioxide absorption method using the carbon dioxide absorbent.

Means for Solving the Problems

To solve the above-mentioned problems, a carbon dioxide absorbent according to the present invention is mainly composed of an oxide that contains Ba, Ca, and Ti, wherein the molar ratio of Ca:(Ba+Ca) is 0.25:1 to 0.65:1, and the molar ratio of (Ba+Ca):Ti is 2.2:1 to 4.0:1.

Preferably, the carbon dioxide absorbent has a main crystal phase of $Ba_3Ca_2Ti_2O_9$.

At least one of a green sheet, a waste green sheet, a waste green sheet laminate, and a green sheet precursor used in a process of manufacturing electronic components can be used as at least part of raw materials of the carbon dioxide absorbent.

The method for absorbing carbon dioxide can include the step of absorbing carbon dioxide at a temperature in the range of 600° C. to 1000° C. using the above carbon dioxide absorbent.

The method for absorbing carbon dioxide can include the step of absorbing carbon dioxide at a temperature in the range of 700° C. to 850° C. using the carbon dioxide absorbent.

Advantages

A carbon dioxide absorbent according to the present invention is mainly composed of an oxide that contains Ba, Ca, and Ti, wherein the molar ratio of Ca:(Ba+Ca) is 0.25:1 to 0.65:1, and the molar ratio of (Ba+Ca):Ti is 2.2:1 to 4.0:1. The carbon dioxide absorbent can efficiently absorb carbon dioxide at a high temperature of at least 700° C.

Since a carbon dioxide absorbent according to the present invention can be used to absorb carbon dioxide at a temperature of at least 700° C., at which it has been difficult to absorb carbon dioxide with conventional absorbents, the carbon dioxide can be directly separated from high temperature exhaust gas. Thus, a carbon dioxide absorbent according to the present invention can be used to separate carbon dioxide before combustion in a hydrogen production process.

The carbon dioxide absorbent according to the present invention can be regenerated by desorbing carbon dioxide under particular conditions. The carbon dioxide absorbent can therefore be used repeatedly to absorb and desorb carbon dioxide.

Furthermore, absorption of carbon dioxide increases the volume of the carbon dioxide absorbent only by about 10%, generating a reduced repetitive stress. Thus, the carbon dioxide absorbent exhibits high durability.

A carbon dioxide absorbent according to the present invention can absorb carbon dioxide at a temperature lower than that of the absorbent mainly composed of $Ba_2TiO_4$, as well as at a high temperature of at least 700° C., and desorb carbon dioxide at a temperature lower than that of the absorbent mainly composed of $Ba_2TiO_4$.

A carbon dioxide absorbent according to the present invention can absorb a larger amount of carbon dioxide than the absorbent mainly composed of $Ba_2TiO_4$. Thus, carbon dioxide can be efficiently removed with a smaller amount of the carbon dioxide absorbent according to the present invention.

A carbon dioxide absorbent according to the present invention can therefore be used to separate carbon dioxide efficiently and consistently.

A carbon dioxide absorbent according to the present invention can be manufactured from barium titanate or calcium titanate, which may be waste dielectric ceramic material.

A preferred carbon dioxide absorbent having a main crystal phase of $Ba_3Ca_2Ti_2O_9$ absorbs carbon dioxide according to the equation (4).

$$Ba_3Ca_2Ti_2O_9+3CO_2 \rightarrow 3BaCO_3+2CaTiO_3 \quad (4)$$

The carbon dioxide absorbent that has absorbed carbon dioxide is heated to desorb carbon dioxide according to the reaction (5), regenerating $Ba_3Ca_2Ti_2O_9$.

$$3BaCO_3+2CaTiO_3 \rightarrow Ba_3Ca_2Ti_2O_9+3CO_2 \quad (5)$$

Thus, the carbon dioxide absorbent can repeatedly absorb and desorb carbon dioxide, and thereby separate carbon dioxide continuously and efficiently at a temperature of at least 700° C.

Furthermore, the absorption reaction of carbon dioxide occurs in a solid phase in a carbon dioxide absorbent according to the present invention. Thus, the carbon dioxide absorbent can consistently absorb carbon dioxide for a long period of time.

If a carbon dioxide absorbent entirely composed of $Ba_3Ca_2Ti_2O_9$ absorbs carbon dioxide according to (4): $Ba_3Ca_2Ti_2O_9+3CO_2 \rightarrow 3BaCO_3+2CaTiO_3$, the absorbent can absorb carbon dioxide stoichiometrically in an amount equal to about 18% by weight of the carbon dioxide absorbent.

If a carbon dioxide absorbent entirely composed of $Ba_2TiO_4$ absorbs carbon dioxide according to (3): $Ba_2TiO_4+CO_2 \rightarrow BaTiO_3+BaCO_3$, the absorbent can absorb carbon dioxide stoichiometrically in an amount equal to about 11% by weight of the carbon dioxide absorbent. Thus, the carbon dioxide absorbent entirely composed of $Ba_3Ca_2Ti_2O_9$ can absorb a much larger amount of carbon dioxide than the absorbent entirely composed of $Ba_2TiO_4$. Hence, a carbon dioxide absorbent according to the present invention can absorb carbon dioxide efficiently, and can thereby advantageously downsize facilities.

A carbon dioxide absorbent according to the present invention mainly composed of $Ba_3Ca_2Ti_2O_9$ can be synthesized by heating barium titanate ($BaTiO_3$), barium carbonate ($BaCO_3$), and calcium carbonate ($CaCO_3$) according to (6).

$$2BaTiO_3+BaCO_3+2CaCO_3 \rightarrow Ba_3Ca_2Ti_2O_9+3CO_2 \quad (6)$$

Alternatively, a carbon dioxide absorbent according to the present invention can be synthesized by heating calcium titanate ($CaTiO_3$) and barium carbonate ($BaCO_3$) according to (5).

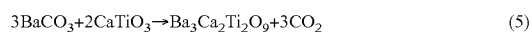
$$3BaCO_3+2CaTiO_3 \rightarrow Ba_3Ca_2Ti_2O_9+3CO_2 \quad (5)$$

At least one of a green sheet, a waste green sheet, a waste green sheet laminate, and a green sheet precursor used in a process of manufacturing electronic components can be used as at least part of raw materials of the carbon dioxide absorbent. Thus, a carbon dioxide absorbent having excellent carbon dioxide absorption performance can be manufactured efficiently, while reusing the waste.

The method for absorbing carbon dioxide can include the step of absorbing carbon dioxide at a temperature in the range of 600° C. to 1000° C. using the carbon dioxide absorbent. This method can be used to absorb carbon dioxide efficiently at high temperatures at which an absorbent composed of lithium silicate cannot absorb carbon dioxide. Thus, the method can be used to separate carbon dioxide before combustion in a hydrogen production process, for example, used for fuel cells.

The method for absorbing carbon dioxide can include the step of absorbing carbon dioxide at a temperature in the range of 700° C. to 850° C. using the carbon dioxide absorbent. This method can be used to absorb carbon dioxide efficiently at a temperature at which the carbon dioxide partial pressure is low, thus offering an additional advantage to the present invention.

REFERENCE NUMERALS

1 vessel
2 heater
3 carbon dioxide absorbent
A and B units
C selector valve

BEST MODES FOR CARRYING OUT THE INVENTION

The present invention will be further described in the following examples of the present invention.

EXAMPLE 1

A $BaTiO_3$ powder, a $BaCO_3$ powder, and a $CaCO_3$ powder at a molar ratio of 2:1:2 and water were mixed in a ball mill for two hours. The resulting slurry was dried at 120° C. for 10 hours.

The resulting powder was fired at 1000° C. for two hours to produce a carbon dioxide absorbent (ceramic powder) according to an example of the present invention.

Figure 1:
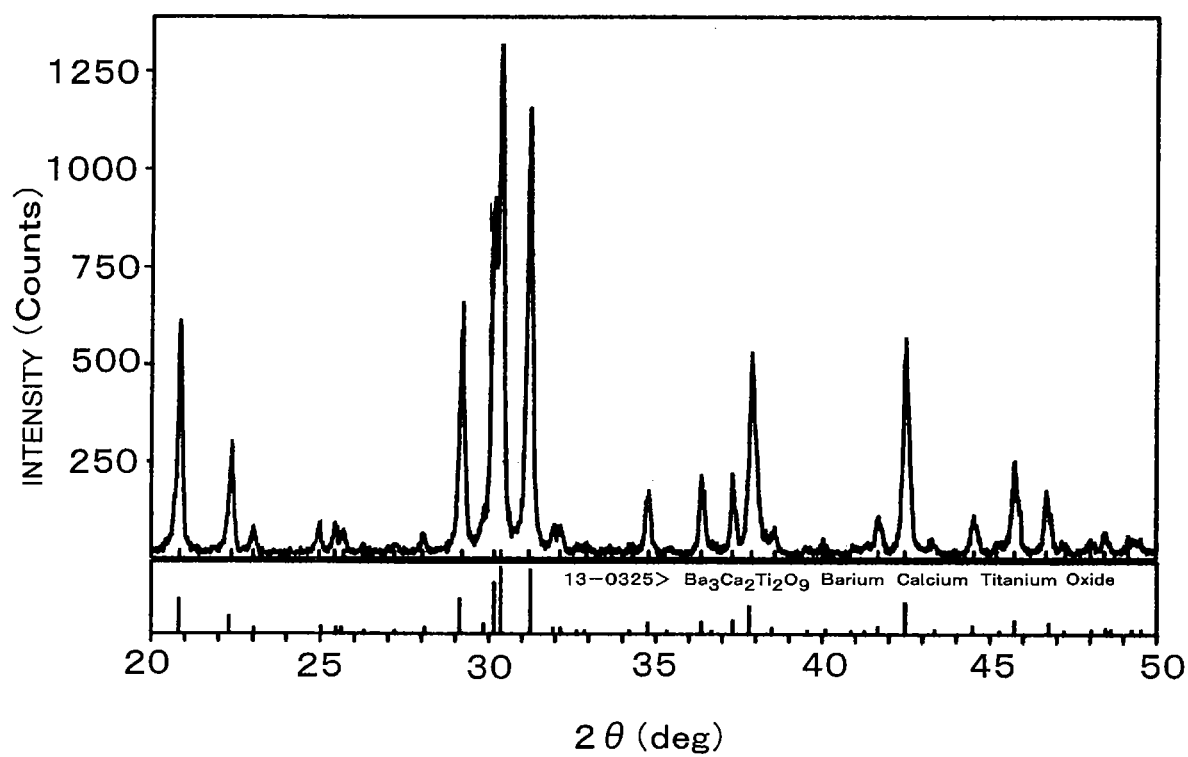
FIG. 1 is an X-ray diffraction chart of a crystal phase of a carbon dioxide absorbent according to an example of the present invention.

The ceramic powder was analyzed by X-ray diffraction. As shown in FIG. 1, the ceramic powder was mainly composed of a substance having a structure of $Ba_3Ca_2Ti_2O_9$.

The ceramic powder was also analyzed by thermogravimetric analysis-differential thermal analysis (TG-DTA) in a mixed gas atmosphere of $CO_2$ and $N_2$.

<Measurement Conditions>
Heating rate: 10° C./min
Atmosphere: $N_2/CO_2$=80/20 (volume ratio)

Figure 2:
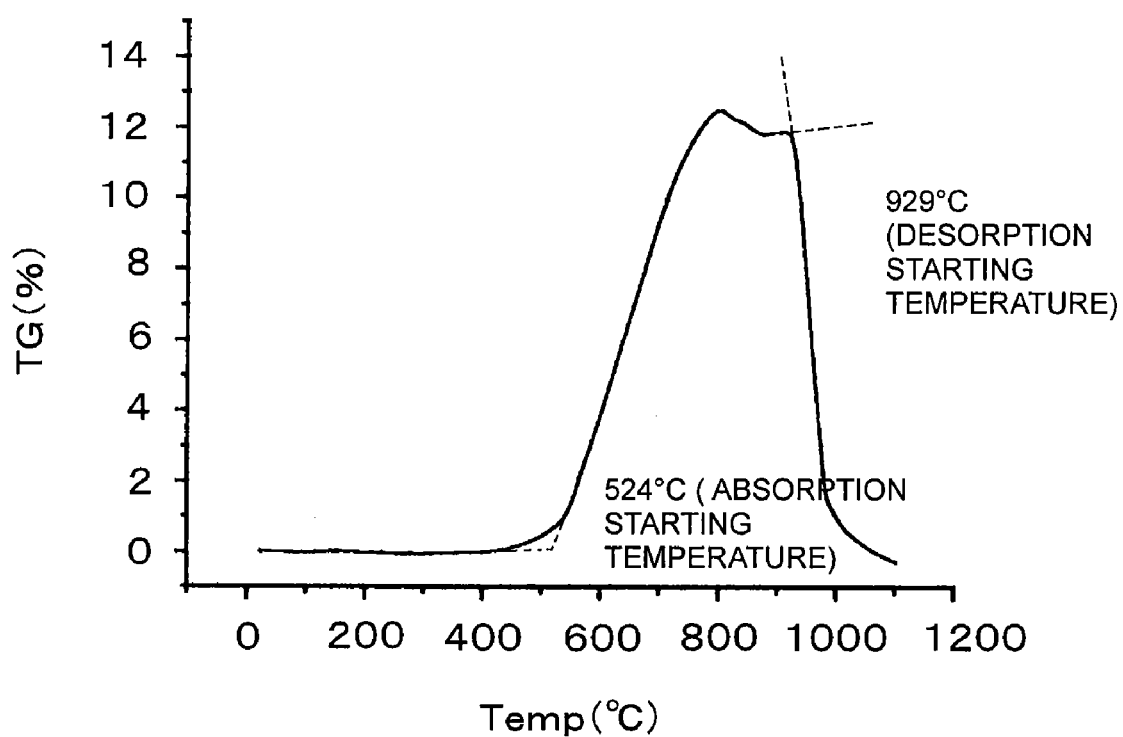
FIG. 2 is a TG-DTA chart of a carbon dioxide absorbent according to an example of the present invention.

As shown in FIG. 2, an increase in weight due to the absorption of carbon dioxide was observed at more than 500° C. The maximum absorption of carbon dioxide was 12.5 parts by weight per 100 parts by weight of ceramic powder (carbon dioxide absorbent) (12.5% increase in the weight of carbon dioxide absorbent).

The carbon dioxide absorbent desorbed carbon dioxide at higher temperatures and returned to being $Ba_3Ca_2Ti_2O_9$.

Figure 3:
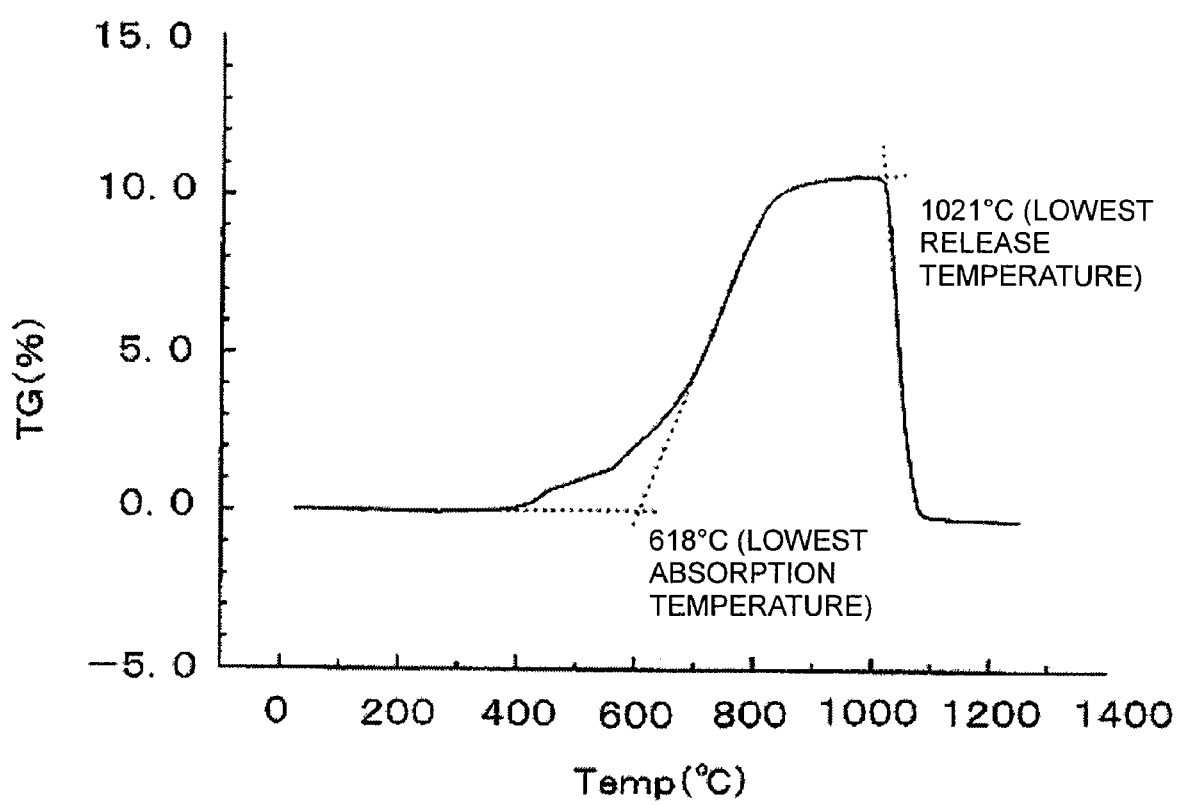
FIG. 3 is a TG-DTA chart of a carbon dioxide absorbent mainly composed of $Ba_2TiO_4$.

For comparison, FIG. 3 shows a TG-DTA chart of a carbon dioxide absorbent mainly composed of $Ba_2TiO_4$ measured under substantially the same conditions.

FIGS. 2 and 3 show that the carbon dioxide absorbent according to the present example started to absorb carbon dioxide at a temperature lower than that of the carbon dioxide absorbent mainly composed of $Ba_2TiO_4$ and completed desorbing carbon dioxide at a temperature lower than that of the carbon dioxide absorbent mainly composed of $Ba_2TiO_4$.

In other words, the carbon dioxide absorbent according to the present example absorbed and desorbed carbon dioxide at a temperature range lower than that of the carbon dioxide absorbent mainly composed of $Ba_2TiO_4$. The carbon dioxide absorbent according to the present example can therefore be used to absorb carbon dioxide efficiently and consistently.

EXAMPLE 2

A ceramic powder was synthesized as in Example 1, except that the molar ratio between the $BaTiO_3$ powder, the $BaCO_3$ powder, and the $CaCO_3$ powder was 1:1:1.

The X-ray diffraction analysis of the ceramic powder showed that, although a hetero phase was partly formed, the ceramic powder was mainly composed of a substance having a structure of $Ba_3Ca_2Ti_2O_9$ as a main crystal phase.

The ceramic powder absorbed and desorbed carbon dioxide substantially in the same manner as the carbon dioxide absorbent in Example 1.

EXAMPLE 3

A ceramic powder was synthesized as in Example 1, except that the molar ratio of the $BaTiO_3$ powder to the $CaCO_3$ powder was 3:4 and $BaCO_1$ was not used.

The X-ray diffraction analysis of the ceramic powder showed that, although a hetero phase was partly formed, the ceramic powder was mainly composed of a substance having a structure of $Ba_3Ca_2Ti_2O_9$ as a main crystal phase.

The ceramic powder absorbed and desorbed carbon dioxide substantially in the same manner as the carbon dioxide absorbent in Example 1.

EXAMPLE 4

A waste ceramic green sheet mainly composed of $BaTiO_3$ produced in the manufacture of a multilayer ceramic capacitor was degreased at 500° C. and was processed into a ceramic powder containing 85% by weight of $BaTiO_3$.

The ceramic powder was mixed with the $BaCO_3$ powder and the $CaCO_3$ powder at a molar ratio between $BaTiO_3$, $BaCO_3$, and $CaCO_3$ of 2:1:2, and was fired at 1000° C. for two hours.

The X-ray diffraction analysis of the ceramic powder showed that, although a hetero phase was partly formed, the ceramic powder was mainly composed of a substance having a structure of $Ba_3Ca_2Ti_2O_9$ as a main crystal phase.

The TG-DTA of the ceramic powder in a carbon dioxide atmosphere under the same conditions as in Example 1 showed that an increase in weight was observed as in Example 1, and that the maximum increase in weight due to the absorption of carbon dioxide was 11.2%.

Discussion about Carbon Dioxide Absorbent According to Examples 1 to 4

In $Ba_3Ca_2Ti_2O_9$, the main component of a carbon dioxide absorbent according to the present invention, part of Ba or Ca forms stable carbonate at a temperature of 800° C. or less. The X-ray diffraction of a crystal phase after the absorption of carbon dioxide showed the generation of barium carbonate, indicating that the absorption of carbon dioxide principally promotes carbonation of Ba.

A carbon dioxide absorbent according to the present invention was found to absorb carbon dioxide even at normal temperature. The TG-DTA chart in FIG. 2 shows that the absorption reaction can be promoted by increasing the temperature.

While $BaTiO_3$, $BaCO_3$, and $CaCO_3$ were used to synthesize $Ba_3Ca_2Ti_2O_9$ in Examples 1 to 4, $BaCO_3$ and $CaTiO_3$ can also be used to synthesize $Ba_3Ca_2Ti_2O_9$ as in Examples 1 to 4, as shown in (5).

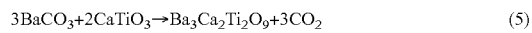

$$3BaCO_3 + 2CaTiO_3 \rightarrow Ba_3Ca_2Ti_2O_9 + 3CO_2 \qquad (5)$$

As shown in (6), $BaTiO_3$, $BaCO_3$, and $CaCO_3$ can also be used to synthesize $Ba_3Ca_2Ti_2O_9$ as in Examples 1 to 4.

$$2BaTiO_3 + BaCO_3 + 2CaCO_3 \rightarrow Ba_3Ca_2Ti_2O_9 + 3CO_2 \qquad (6)$$

The composition of starting materials may be slightly different from the composition of $Ba_3Ca_2Ti_2O_9$ to synthesize $Ba_3Ca_2Ti_2O_9$. Even if a hetero phase is formed, the resulting reduction in $Ba_3Ca_2Ti_2O_9$ content only results in a reduction in the absorption of carbon dioxide. Thus, slight variations in the composition of starting materials have no significant effect on the basic absorption characteristics.

EXAMPLE 5

Figure 4:
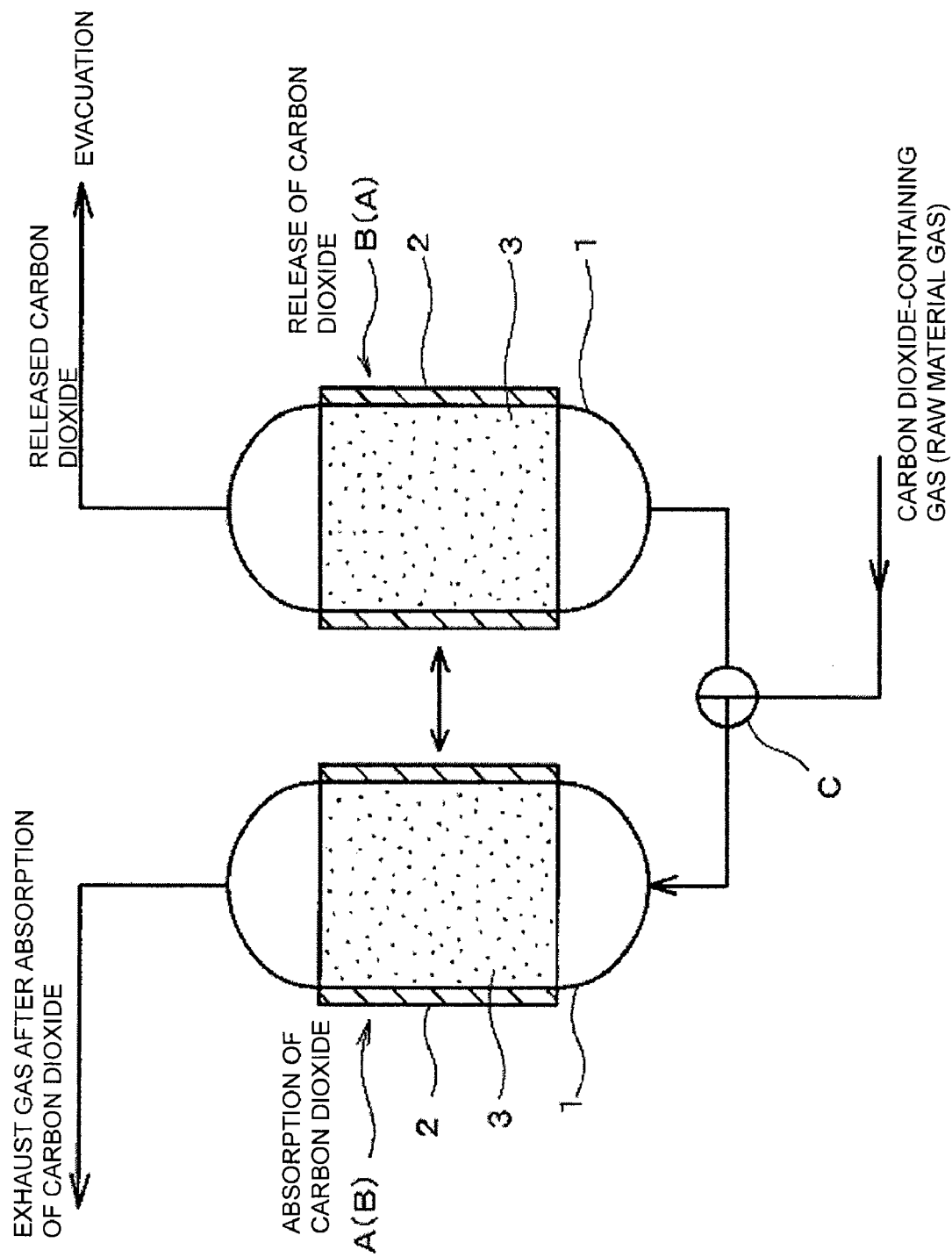
FIG. 4 is a schematic view of a carbon dioxide separator according to an example of the present invention.

FIG. 4 is a schematic view of a carbon dioxide separator that utilizes a carbon dioxide absorption method according to an example of the present invention.

In the carbon dioxide separator, a carbon dioxide absorbent according to the present invention absorbs carbon dioxide in a combustion exhaust gas (carbon dioxide-containing gas) to desorb and recover the carbon dioxide. The carbon dioxide separator includes a carbon dioxide absorption unit A(B), a carbon dioxide desorbtion unit B(A), and a selector valve C for switching the flow of a combustion exhaust gas.

In FIG. 4, the selector valve C is selected to supply the carbon dioxide-containing gas (raw material gas) to the left unit A, which functions as a carbon dioxide absorption unit. The right unit B functions as a carbon dioxide desorbtion unit.

Each of the units A and B includes a vessel 1, a heater 2, and a carbon dioxide absorbent 3 according to the present invention (carbon dioxide absorbent according to Example 1) charged in the vessel 1.

As illustrated in FIG. 4, when the selector valve C is selected to supply the combustion exhaust gas to the left unit A, the unit A (carbon dioxide absorption unit) absorbs carbon dioxide in the combustion exhaust gas (in this Example 5, the combustion exhaust gas has a normal pressure and a temperature of about 700° C. and contains 20% by volume carbon dioxide ($CO_2$)).

The unit B (carbon dioxide desorbtion unit) is evacuated through the exit of the vessel 1 to a pressure of 10 kPa or less (for example, 1000 Pa). The carbon dioxide absorbent 3 absorbing carbon dioxide in the vessel 1 of the unit B is heated to 800° C. by the heater 2 to desorb the carbon dioxide. Thus, carbon dioxide can be recovered at high concentration, and the carbon dioxide absorbent 3 is regenerated for reuse.

The absorption reaction of carbon dioxide in the carbon dioxide absorbent in the carbon dioxide separator is represented by (4).

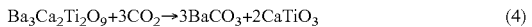

$$Ba_3Ca_2Ti_2O_9 + 3CO_2 \rightarrow 3BaCO_3 + 2CaTiO_3 \quad (4)$$

The desorbtion reaction of carbon dioxide in the carbon dioxide absorbent is represented by (5).

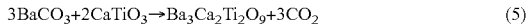

$$3BaCO_3 + 2CaTiO_3 \rightarrow Ba_3Ca_2Ti_2O_9 + 3CO_2 \quad (5)$$

When the carbon dioxide absorption performance of the carbon dioxide absorbent 3 in the unit A (carbon dioxide absorption unit) deteriorates, the selector valve C is selected to supply the combustion exhaust gas to the right unit B. Thus, the carbon dioxide absorbent 3 in the unit B (carbon dioxide absorption unit) absorbs carbon dioxide in the combustion exhaust gas.

The unit A is evacuated through the exit of the vessel 1 to a pressure of 10 kPa or less (for example, 1000 Pa). The carbon dioxide absorbent 3 absorbing carbon dioxide in the vessel 1 of the unit A is heated to 800° C. by the heater 2 to desorb the carbon dioxide. Thus, carbon dioxide is recovered, and the carbon dioxide absorbent 3 is regenerated.

These procedures can be performed repeatedly to recover carbon dioxide consistently for a long period of time.

When the unit A and the unit B are alternately switched between the carbon dioxide absorption unit and the carbon dioxide desorbtion unit, the flow passes of gasses emitted from the units A and B can be switched easily with an additional selector valve.

As described above, the carbon dioxide absorbent according to Example 1, in the carbon dioxide separator according to Example 5, absorbs carbon dioxide in the combustion exhaust gas, which has a normal pressure and a temperature of about 700° C. and contains 20% by volume carbon dioxide. The carbon dioxide absorbent absorbing carbon dioxide is heated at a predetermined temperature (800° C.) under reduced pressure (1000 Pa) to desorb the carbon dioxide. Thus, the carbon dioxide absorption unit can properly absorb carbon dioxide at a high temperature, and the carbon dioxide desorbtion unit can properly desorb the carbon dioxide (regenerate the carbon dioxide absorbent). Hence, the separation and recovery of carbon dioxide at a high temperature can be performed economically, consistently, and efficiently.

While the carbon dioxide absorbent is a powder in the examples described above, a carbon dioxide absorbent according to the present invention may be somewhat large grains, a compact of a certain shape, such as a cube, a rectangular parallelepiped, or a sphere, a sheet-like compact, or a combination thereof.

The present invention is not limited to these examples. Various modifications and changes may be made in the type of starting materials, the specific synthesis method, and the synthesis conditions of a carbon dioxide absorbent according to the present invention, and the conditions for absorbing carbon dioxide with the carbon dioxide absorbent, without departing from the scope of the present invention.

INDUSTRIAL APPLICABILITY

As described above, a carbon dioxide absorbent according to the present invention is mainly composed of an oxide that contains Ba, Ca, and Ti, wherein the molar ratio of Ca:(Ba+Ca) is 0.25:1 to 0.65:1, and the molar ratio of (Ba+Ca):Ti is 2.2:1 to 4.0:1. The carbon dioxide absorbent can efficiently absorb carbon dioxide at a high temperature of at least 700° C.

Since a carbon dioxide absorbent according to the present invention can be used to absorb carbon dioxide at a temperature of at least 700° C., carbon dioxide can be directly separated from high temperature exhaust gas. Thus, a carbon dioxide absorbent according to the present invention can be used to separate carbon dioxide before combustion in a hydrogen production process.

Thus, the present invention can be widely applied to separation of carbon dioxide in various carbon dioxide-containing gases, including separation of carbon dioxide before combustion in a hydrogen production process, removal of carbon dioxide in combustion exhaust gas produced in factories, and removal of carbon dioxide in exhaust gas from automotive engines.

The invention claimed is:

1. A method for absorbing carbon dioxide, comprising exposing carbon dioxide at a temperature in the range of 600° C. to 1000° C. to a carbon dioxide absorbent having a main crystal phase of $Ba_3Ca_2Ti_2O_9$.

2. The method, according to claim 1, wherein the temperature is in the range of 700° C. to 850° C.

3. A method for absorbing carbon dioxide, comprising exposing carbon dioxide at a temperature in the range of 600° C. to 1000° C. to a carbon dioxide absorbent comprising an oxide of Ba, Ca, and Ti, wherein the molar ratio of Ca:(Ba+Ca) is 0.3:1 to 0.6:1, and the molar ratio of (Ba+Ca):Ti is 2.3:1 to 3:1.

4. The method for absorbing carbon dioxide according to claim 3, wherein the temperature is in the range of 700° C. to 850° C.

5. A method for absorbing carbon dioxide, comprising exposing carbon dioxide at a temperature in the range of 600° C. to 1000° C. to a carbon dioxide absorbent comprising an oxide of Ba, Ca, and Ti, wherein the molar ratio of Ca:(Ba+Ca) is 0.25:1 to 0.65:1, and the molar ratio of (Ba+Ca):Ti is 2.2:1 to 4.0:1.

6. The method for absorbing carbon dioxide according to claim 5, wherein the temperature is in the range of 700° C. to 850° C.

* * * * *